US005293127A

United States Patent [19]

Palkovich et al.

[11] Patent Number: 5,293,127

[45] Date of Patent: Mar. 8, 1994

[54] SUPPORT ROD

[75] Inventors: Alex Palkovich, Oxford; John Bird, Charlbury; Neil Clarke, Oxford, all of England

[73] Assignee: Elscint Ltd., Haifa, Israel

[21] Appl. No.: 22,388

[22] Filed: Feb. 24, 1993

Related U.S. Application Data

[63] Continuation of Ser. No. 658,247, Feb. 20, 1991, abandoned.

[30] Foreign Application Priority Data

Feb. 20, 1990 [GB] United Kingdom .............. 9003779.7

[51] Int. Cl.[5] ............................................... G01V 3/00

[52] U.S. Cl. ....................................... 324/318; 62/53.2

[58] Field of Search ........................ 324/300, 318, 322; 62/45.1, 53.2, 53.3; 220/425; 422/104

[56] References Cited

U.S. PATENT DOCUMENTS

| | | | |
|---|---|---|---|
| 3,782,128 | 1/1974 | Hampton et al. | 62/45.1 |
| 3,905,508 | 9/1975 | Hibl et al. | 220/425 |
| 4,343,413 | 8/1982 | Chatzipetros et al. | 220/425 |

*Primary Examiner*—Louis Arana

*Attorney, Agent, or Firm*—Sandler Greenblum & Bernstein

[57] ABSTRACT

A support rod for supporting structures in a cryostat of a magnetic resonance system. The support rod has oppositely disposed stainless steel heads mounted on a glass reinforced plastic rod. The heads have threads on the main body thereof to minimize the length of the heads and thereby minimize heat condition.

5 Claims, 2 Drawing Sheets

SUPPORT ROD

This application is a continuation, of U.S. application Ser. No. 07/658,247, filed Feb. 20, 1991 now abandoned.

FIELD OF THE INVENTION

This invention is concerned with superconducting magnets used in magnetic resonance imaging systems and more particularly with support rods for supporting structures within a cryostat such as the superconducting magnets within the dewar of such systems.

BACKGROUND OF THE INVENTION

The present invention relates to rods used for mounting structures in cryostats. The cryostat is a containing vessel designed to thermally isolate its interior from exterior ambient temperature conditions. To achieve the desired degree of thermal isolation, multiple nested vessels are generally employed with each of the multiple vessels functioning at one of a sequence of temperatures. The interior temperature of the inner-most vessel of the dewar is at the coldest temperature.

The vessels and the magnet have to be supported. The support structure should have minimal heat conductivity. For example, the magnet has to be supported within the dewar and yet spaced apart from the walls of the dewar with sufficient rigidity to withstand the shifting loads caused by the high magnetization of the magnet; i.e., 2 Tesla, for example. These loads include loads caused by hysteresis currents. Typically, in a magnetic resonance system, the inner-most vessel is a helium containing vessel which surrounds the superconducting magnet.

Heat shields help to isolate the nested vessels from each other. In most cryostats used in magnetic resonance systems, an innermost helium vessel is surrounded by a vessel containing nitrogen. Support rods are used to support the magnet and keep it stationary in three-dimensions by balancing out the magnet's weight and the forces generated by the magnetic field. The support rods are generally comprised of oppositely disposed stainless steel head sections and a low thermally conductive extended rod-like section connecting the head sections. The prior art head sections each has a threaded horn-like section and a receiving cylindrical bore containing-section. The low thermally conductive section fits into a bore of the bore containing section. The head sections are then crimped to the low thermally conductive section.

One horn-like threaded section is threaded into an outer nut means that retains and secures the support rod to the outer vacuum container. The head section at the other end of the low thermally conductive section of the support rod is connected to the actual magnet. The relatively long head section in the above described presently available support rod causes the support rod to conduct a relatively large amount of heat from outside the cryostat to the superconducting magnet.

It is an object of the present invention to provide a magnetic resonance cryostat that use a new support rod system wherein the support rod is designed to minimize heat conducted to the superconducting magnet from the ambient environment external to the cryostat.

In accordance with one preferred aspect of the present invention, a support rod for supporting structures in a dewar of a cryostat used in a magnetic resonance system is provided, said support rod comprising:

a rod-like mid-section of low thermally conductive material, a first head section of material of higher thermal conductivity than the material of said rod-like mid-section disposed on one end of said rod-like mid-section, a second head section of material of higher thermal conductivity than the material of said rod-like mid-section disposed on the other end of said rod-like mid-section, means for connecting said first head section of the support rod to structure in the interior of the cryostat, means for connecting said second head section to the outer vacuum container, and means for minimizing the length of said head sections.

A related feature of the present invention utilizes a portion of the main body of the head section for crimping onto an end of said rod-like mid-section. The main body of the head sections themselves are threaded for connecting the assembled support rod from the supported structure to a base means on a support structure associated with the cryostat.

BRIEF DESCRIPTION OF THE DRAWINGS

While the specification concludes with claims particularly pointing out and distinctinly claiming the present invention, the objects and advantages of the invention can be more readily ascertained from the following description of a preferred embodiment of the present invention, when considered in conjunction with the accompanying drawings, in which:

DETAILED DESCRIPTION OF THE INVENTION

Figure 1:
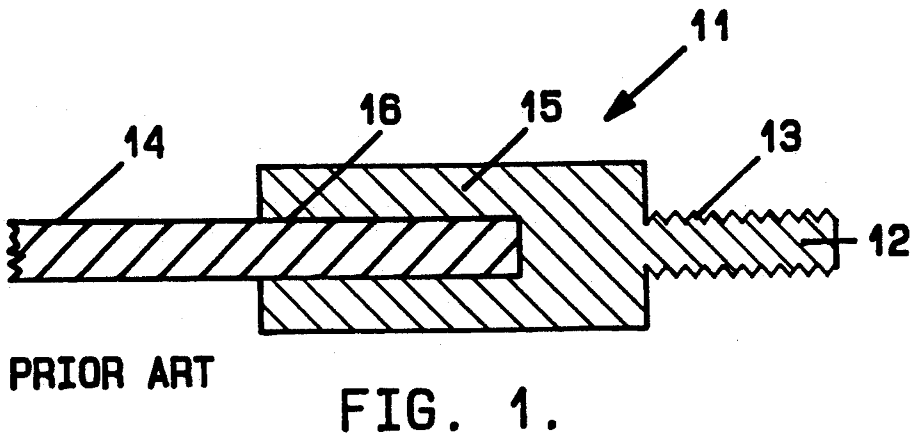
FIG. 1 is a sectional view of a prior art support rod.

The cross sectional view of FIG. 1 of the prior art support rod shows a support rod 11 that comprises a head section 12 having an integrally connected threaded horn-like section 13. The head section is preferably fabricated from a relative non-magnetic material such as stainless steel. An extended rod-like mid-section 14 is preferably of a relatively low heat conductive material such as glass reinforced plastic. A second head section (not shown) identical to the first head section is mounted on the other end of the rod-like mid-section.

A receiving bore section 15 of the stainless steel head section 12 of the support rod has a bore 16 therein designed to receive the extended mid-section 14 therein. The attachment between the head sections such as the illustrated head section 12 and the extended mid-section section 14 is accomplished by crimping.

Figure 2:
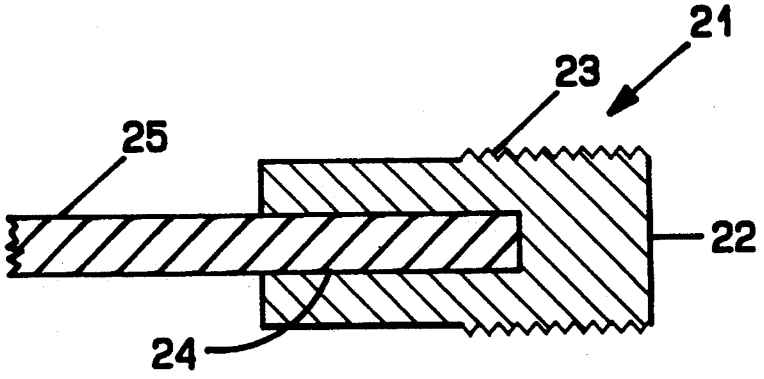
FIG. 2 is a sectional view of an inventive support rod.

In the inventive design shown in FIG. 2, the support rod 21, comprises a head section 22 without any extended horn-like section. Instead, a portion of the main body of the head section is externally threaded at 23. The head section 22 also features a bore 24 preferably having a cylindrical shape extending therein designed to receive the extended rod-like mid-section 25 of the support rod. The extended rod-like mid-section is made up of low thermal conducting material, such as glass reinforced plastic. The preferred means for attaching the head section 22 to the low thermal conducting extended mid-section 25 is by crimping.

A second head section (not shown) substantially identical to the first head section is disposed on the other end of the extended mid-section. The head section is preferably of stainless steel or cold rolled steel or other such materials that are resistive to magnetism and are threaded to firmly attach the support rod between a base point at the outer vacuum container and a base point on the structure being supported.

Figure 3:
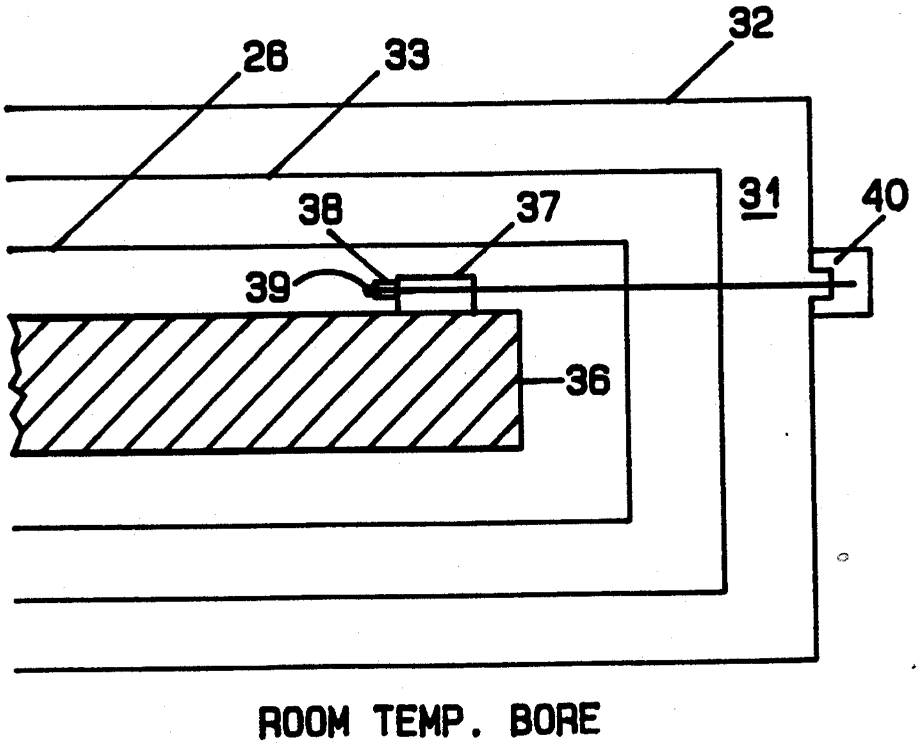
FIG. 3 is a sectional view showing the inventive support rod secured to the outside of a dewar and extending through the thermal shields into the dewar supporting a superconducting magnet.

The dewar containing the superconducting magnet 36 is shown in FIG. 3. The glass reinforced plastic rod-like mid-section of the rod also extends through a second heat shield 26 and into the dewar of the cryostat where the superconducting magnet is located.

The second heat shield in one preferred embodiment is maintained at 20 Kelvin. As shown as in FIG. 3, a head section of the support rod is fixedly attached and secured to the superconducting magnet 36 at a base point comprising a cube-like block 37 fixedly attached to the magnet. The rod extends through the cube-like block and is fixed thereto by a threaded nut 38 on the threaded end section of the second head section 39 of the rod 21.

As shown in FIG. 3, the outer-vacuum container 31 is defined by a wall 32 on the outer-side and on the inner-side by a wall 33 that comprises a first heat shield which in one preferred embodiment is maintained at 77 Kelvin.

Figure 4:
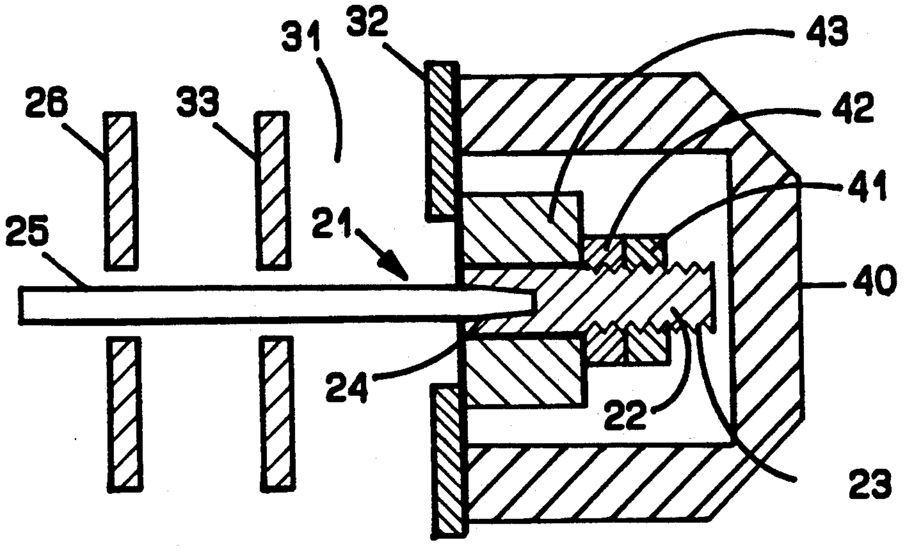
FIG. 4 is a schematic sideview showing the inventive support rod extending to the outside of the outer vacuum container (OVC) of the dewar.

As shown in FIG. 4, the threaded portion of the first head section of the support rod has a pair of nuts 41 and 42 attached thereto. The nuts press up against a large box-shaped washer section 43. The washer in turn presses against the wall 32 of the outer vacuum container 31. A thermally low conductive cover 40 is shown mounted to cover the opening in the dewar used by the support rod.

Notice that no portion of the first head section 22 extends into the dewar. It is only the low thermally conductive mid-section 21 that extends into the dewar. This dramatically reduces the flow of heat into the dewar through support rods.

Figure 5:
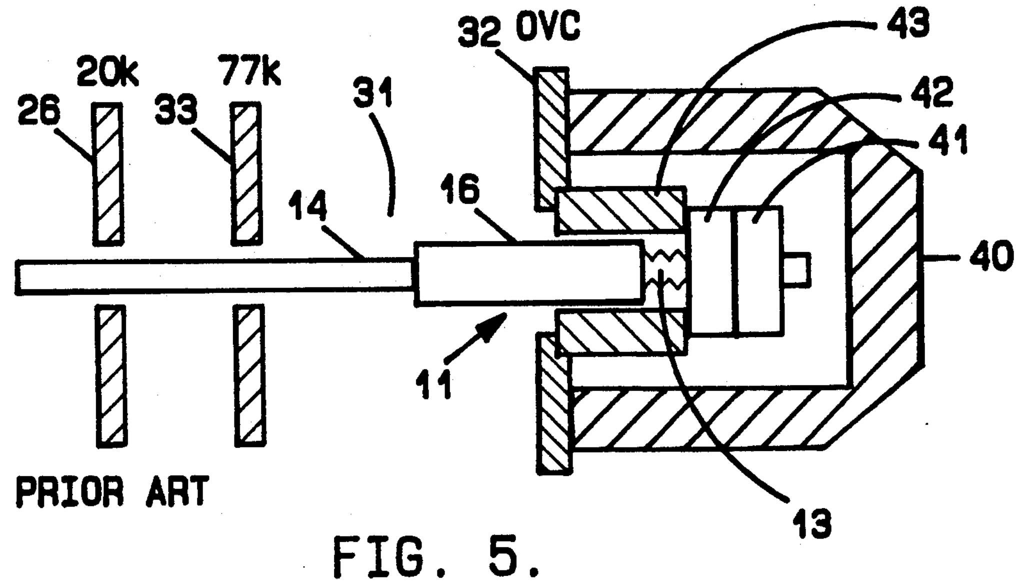
FIG. 5 is a schematic sideview showing a prior art support rod extending to the outside of the OVC of the dewar.

By contrast, FIG. 5 illustrates how in the prior art support rods such as rod 11, the head section 16, was comparatively much longer and extended well into the dewar. In FIG. 5 the support rod is shown attached to the outer wall of the dewar in the same manner as the connection of the new support rod to the base point on the OVC. However, because of the comparatively longer head section, the prior art support rods enabled much more heat to enter the dewar than the new rods allow.

Figure 6:
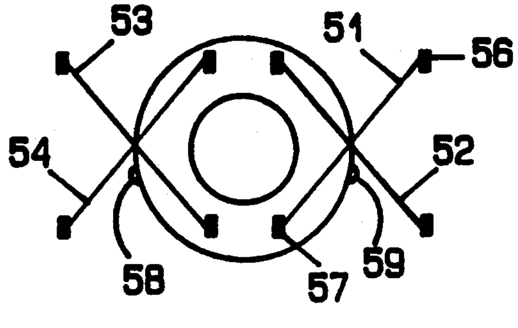
FIG. 6 is an end view showing support rods supporting said magnet and extending to base points at the outside of the OVC of the dewar.

FIG. 6 shows the support rods connected to the magnet in an endview. Thus, in FIG. 6 it is seen that the support rods are at approximately 90° to each other and 45° to the horizontal. Four support rods are shown 51, 52, 53 and 54. Horizontal support rods 58, 59 are also indicated. The fixing point to the outer vacuum container is shown by way of example, on support rod 51 at 56. The attachment point to the magnet is shown, for example, on support rod 51 at attachment 57.

It should be understood that while magnet support rods are described, the same inventive feature applies to the other support rods; i.e., the support rods for the shields and/or for supporting one vessel inside the other vessel. Thus, each of the support rods uses a minimum of relatively high conductive material and a maximum of relatively low conductive material thereby reducing the heat flow from the higher ambient temperatures on the exterior of the cryostat to the lower temperatures inside the dewar.

While the invention has been described with respect to a preferred embodiment thereof, it will be apparent that certain modifications and changes can be made without departing from the spirit and scope of the invention. It is, therefore, to be understood that the claims appended hereto are intended to cover all such modifications and changes as come within the true spirit of the invention.

What is claimed is:

1. A support rod in combination with a cryostat for supporting a superconducting magnet within said cryostat, said support rod comprising:

a rod like mid-section of material of low thermal conductivity, a first head section of higher thermal conductivity disposed at the other end of said support rod, a second head section of higher thermal conductivity disposed at the other end of said support rod, said first and second head sections being threaded to anchor said support rod between a supporting member on the cryostat and said supported magnet, said supporting member mounted on the outside of said cryostat so as to minimize the length of said head sections relative to said mid section inside said cryostat, and thermally reduce the heat transfer between the cryostat and the environment, said mounting on the outside of said cryostat enabled by said first and second head sections each being cylindrically shaped and having a single external diameter for the entire length.

2. The support rod of claim 1 including bore means in said head section, said bore means having a cylindrical shape for receiving said rod-like mid-section, and said head section being attached to said rod-like mid-section by crimping.

3. The support rod of claim 2 wherein said rod-like mid-section is fabricated from glass reinforced plastic.

4. The support rod of claim 3 wherein at least one of said head sections is fabricated from material having a high magnetic reluctance.

5. A support rod in combination with a cryostat for supporting superconducting magnet within said cryostat, said support rod comprising a rod-like extended section of material of low conductivity, a first head section of higher thermal conductivity rigidly coupled by crimping at one end of said support rod, a second head section of higher thermal conductivity rigidly coupled by crimping at the other end of said support rod, a first head section of higher thermal conductivity rigidly coupled by crimping at one end of said support rod, external threading on said head sections for connecting said support rod between a supporting member external to said cryostat and said superconducting magnet to support said superconducting magnet, and said first head section being entirely external to the cryostat with the superconducting magnet of said system supported by said support member, said first and second head sections having a cylindrical shape with a single diameter, to enable said first head section to be entirely external to the cryostat with the superconducting magnet of said system supported by said support member, and to thermally reduce the heat transfer between the cryostat and the environment.

* * * * *